Patented Feb. 16, 1932

1,845,961

UNITED STATES PATENT OFFICE

CLAY C. DAVIS, OF BELLINGHAM, WASHINGTON, ASSIGNOR TO WHATCOM COUNTY DAIRYMEN'S ASSOCIATION, OF BELLINGHAM, WASHINGTON, A CORPORATION

MILK PRODUCT

No Drawing. Application filed December 15, 1928. Serial No. 326,413.

This invention relates to a novel milk product, and particularly to a milk product providing an economical and highly wholesome and nutritious food for poultry and all kinds of live stock. This product consists of a high-acid-content combination of the solid constituents of sweet skimmed milk and sweet churned buttermilk in the form of a thick, viscous, non-wheying paste of a smooth and velvet-like consistency and having great keeping qualities and a fine taste and flavor, and which, when fed alone or mixed with various kinds of stock feed, forms a nourishing food which is eaten with great avidity by poultry and other stock. A valuable property of this product is that it is free from yeasts, molds and harmful bacteria, pathogenic or otherwise, and contains the casein content in a condition in which it is readily assimilable by the animal organism.

The invention consists of a milk product having these desirable characteristics and a novel method of making the same.

In carrying my invention into practice for the manufacture of a food product of the character described, I first place in a suitable vat fresh sweet buttermilk and fresh skimmed milk in suitable proportions. The buttermilk employed should have an acid content of 2½% or less, the buttermilk being the remainder after the butter fat is collected by churning from pasteurized sweet milk. The fresh skimmed milk employed is that obtained by separating the cream and skim milk from fresh sweet milk from healthy cows. A suitable combination of the buttermilk and skimmed milk is obtained by combining the same in the proportion of about two parts in volume of sweet skimmed milk to one part of sweet buttermilk.

The sweet churned buttermilk and sweet skimmed milk are then thoroughly mixed, as by agitation, to blend them thoroughly together, and the mixture heated to a temperature of from 100° to 102° F., and then inoculated with from .5% to 2% of a mycoderm bacterial culture in sufficient volume and of such virility that the milk will be raised to such a point of acidity as to produce from 5% to 6% lactic acid in the finished product containing from 20% to 28% total solids. It is well known to those engaged in the manufacture of dairy products that there is in churned buttermilk a nitrogenous substance which is supposed to be the remainder of the butter fat globules when these globules are united together into butter in the process of churning the cream. This substance, discovered by Storch, and commonly called "Storch's mucoid protein", is lacking in skim milk and has a tendency to form a coarse texture on condensing the buttermilk into paste form in the vacuum pan. I have discovered that by blending together at least two parts of sweet skimmed milk with one part of sweet buttermilk, neither of which has been neutralized to bring back normal acidity, this protein and coarseness generally produced thereby is eliminated, by my process, in the finished product. The blending of the sweet milk and buttermilk is done before the culture is added to develop the acidity before condensing.

The inoculated mixture is allowed to remain at rest or quiescent, for a period of from 12 to 16 hours after inoculation to allow it to ripen and reach the best condition for further treatment. The amount of culture used to develop the proper acidity varies with conditions. With a normally active culture, 1% may be used and allowed to work in the milk at 100° F. for 16 hours. If the product is to be completed within a minimum period of time, the same effect may be secured in 12 hours by using 2% culture. If the culture is very active the amount used may be reduced to .5%, the temperature and vitality of the organism determining the amounts practical to use. The ripened milk is then removed from the vat and subjected, successively in small portions, to a temperature of 190° F., thereby destroying all bacterial life and causing a chemical reaction in the acid milk by which the casein is reduced to a smooth, liquid, viscous condition. The treatment of the ripened milk in small portions or in small volume for this purpose is of importance. The surplus water is then evaporated from the hot milk under vacuum at 150° F., and the finished product is packaged for storage or shipment in air-tight containers. The foodstuff thus produced is in the form of a thick, viscous, non-wheying paste which is of a smooth and velvety texture, of fine-keeping qualities, and of such taste and flavor that it is eaten with avidity by poultry and all kinds of live stock. It may be served for use alone in suitable quantities or may be mixed with other stock foods, to form a balanced and highly nutritious ration.

The ripening of the milk with a virile mycoderm culture provides a highly acid product in a time so short that any action of putrefactive or decay organisms, liable to cause staleness or flat or metallic flavors, is prevented. By using buttermilk from pasteurized sweet cream and by pasteurizing the product at the temperature noted, 190° F., the yeasts, molds and bacteria, pathogenic and otherwise, are entirely eliminated and prevented from being distributed into human or animal consumptive channels. The high percentage of acid obtained in the short ripening period preserves the product from deterioration, and this acid content will not increase or decrease since the bacteria causing this action and their enzymes, if any, are killed by the process of heating to 190° F. The vacuum used at 150° F. in evaporating the surplus moisture from the acid milk in the presence of from 5% to 6% of lactic acid causes the cells of casein and other constituents in the milk to lose their adhesiveness or glue-like characteristics and to be disrupted by explosive action so as to be reduced to and be present in the product in a very highly divided condition, and so as to be highly moisture absorbent and remain permanently in a smooth paste-like condition, while at the same time placing the casein in a state in which it is readily assimilable by the animal organism. By sealing the product in air-tight containers it is kept pure and uncontaminated until opened for use.

Having thus described my invention, I claim:—

1. A stock food product comprising a mycoderm bacteria culture ripened pasteurized and evaporated mixture of sweet skim milk and sweet buttermilk in the form of a thick, viscous, non-wheying paste having a high lactic acid content and in which the casein and other cellular constituents of the milk are in a finely divided state such as produced by reduction of the casein and other cellular constituents of the ripened milk subjected in small portions to the action of explosive disruption.

2. The method of making a stock food product, which consists in mixing sweet buttermilk one part and sweet skim milk 2 parts until thoroughly blended, heating the mixture to a temperature of from 100° to 102° F., inoculating the same with a mycoderm bacterial culture in sufficient volume and of such virility as to raise the milk to such a degree of acidity that from 20% to 28% of the total solids of the product will contain from 5% to 6% lactic acid at a period of from 12 to 16 hours after inoculation, allowing the milk to rest until ripened, successively subjecting small proportions of the ripened milk to a temperature of about 190° F., so as to destroy all bacterial life and cause a chemical reaction whereby the casein content is reduced to a smooth liquid, viscous condition, and evaporating the hot milk in vacuum at a temperature of about 150° F., so as to eliminate excessive moisture and reduce the casein and other cellular constituents of the milk to a subdivided condition by explosive action.

In testimony whereof I affix my signature.

CLAY C. DAVIS.